April 9, 1940.  L. SLOAN  2,196,479
ADJUSTABLE DRIVE
Filed Aug. 24, 1936  2 Sheets-Sheet 1
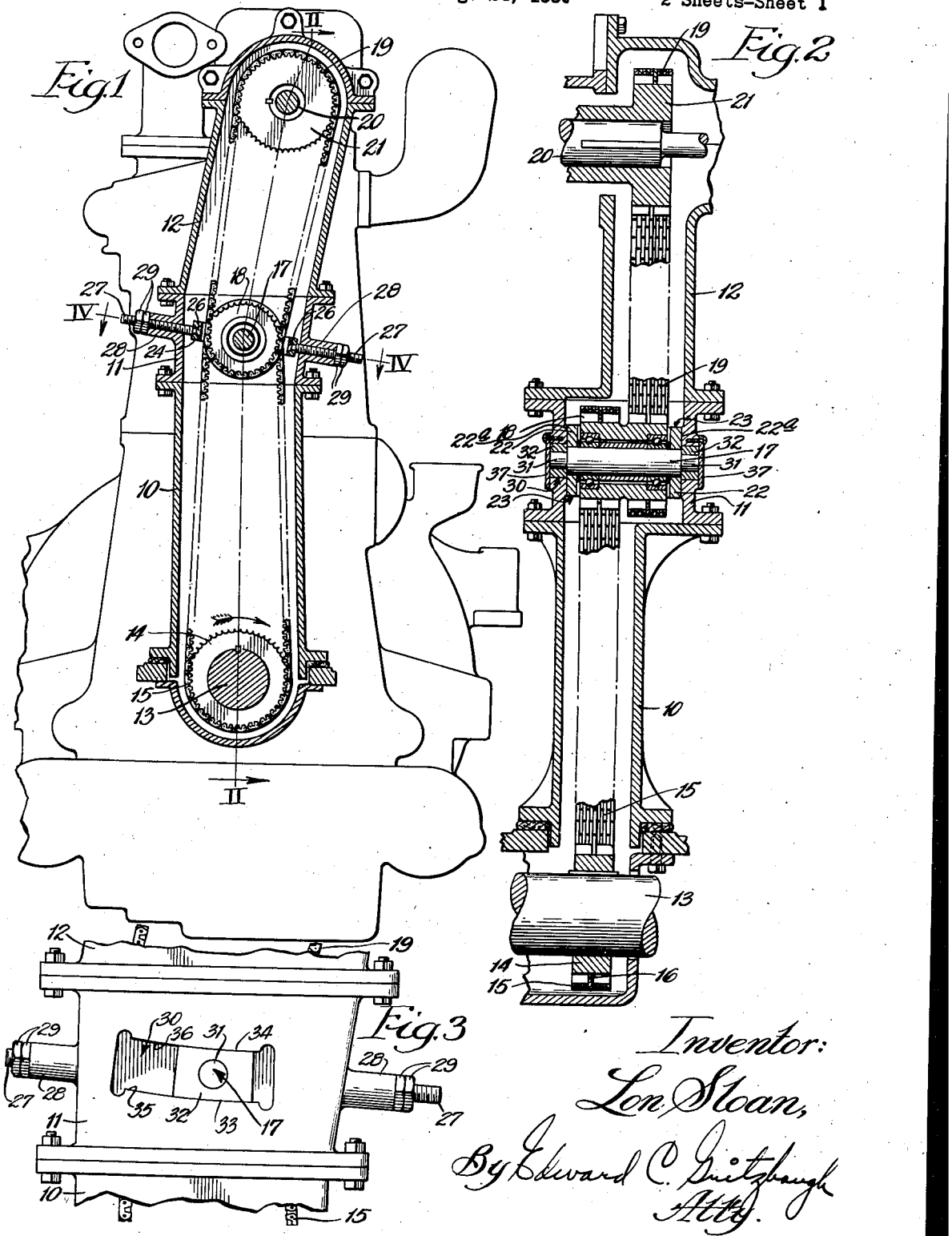
Inventor:
Lon Sloan,
By Edward C. Gritzbaugh
Atty.

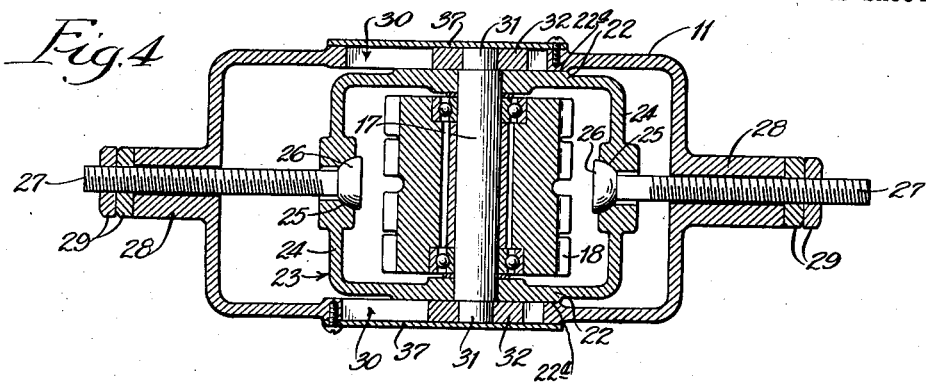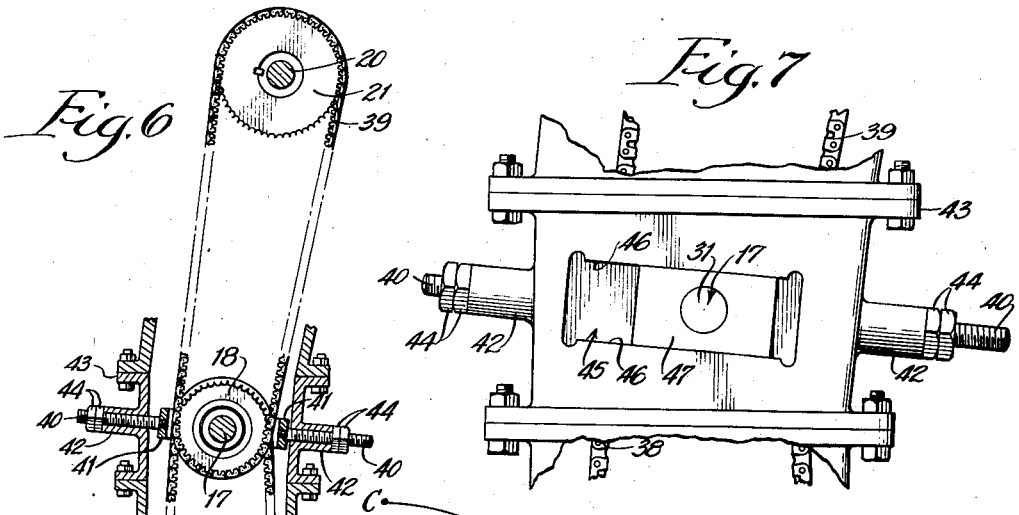

Patented Apr. 9, 1940

2,196,479

UNITED STATES PATENT OFFICE 2,196,479

ADJUSTABLE DRIVE

Lon Sloan, Chicago, Ill., assignor to Morse Chain Company, Ithaca, N. Y., a corporation of New York Application August 24, 1936, Serial No. 97,543

6 Claims. (Cl. 74—242.8)

This invention relates in general to slack adjusting mechanisms and more particularly to means for taking up slack in a plurality of devices such as driving chains.

It is an object of the invention to provide means for taking up slack in a plurality of chains in proportion to the amount of slack in said devices.

It is also an object of the invention to provide slack-adjusting means operable without interrupting operation of the chains to be adjusted.

A further object of the invention resides in the provision of a single mechanism operative to adjust a plurality of chains.

Another object of the invention is to provide for simultaneous adjustment of a plurality of chains or the like.

It is another object of the invention to provide in conjunction with a pair of chain or like drive elements connected by an idler, for adjustment of the idler in such a path as to accurately take up slack in the chains and restore the assembly to the original phase relation between the driving and driven parts.

A further object of the invention resides in the provision, in a chain drive comprising a pair of chains and a cooperative countershaft, of a countershaft assembly adapted for expeditious insertion in and removal from the assembly.

Further objects and advantages of the invention will appear as the description proceeds.

Fig. 1 is a fragmentary section-elevation showing the invention applied to an engine such as a Diesel engine.

Fig. 2 is an enlarged fragmentary section-elevation taken substantially as indicated by the line II—II in Fig. 1.

Fig. 3 is an enlarged fragmentary elevational view of the adjusting mechanism.

Fig. 4 is an enlarged sectional view taken substantially as indicated by the line IV—IV in Fig. 1.

Fig. 5 shows a diagram illustrating the path of movement of the countershaft for correct slack adjustment for a given chain and sprocket arrangement.

Fig. 6 shows a modified form of the invention.

Fig. 7 is an enlarged fragmentary elevation of the adjusting unit appearing in Fig. 6.

Referring now more particularly to the drawings, there is shown in Fig. 1 an outline of an engine such as a Diesel engine, provided with an elongated casing or housing structure comprising a crank shaft and cam shaft housings 10 and 12, and an intermediate section 11 connected thereto. The housing 10 receives a crank shaft 13 carrying a chain sprocket 14 about which passes a chain 15. The sprocket 14 may be double toothed and provides an intermediate groove 16 in which guide links of the chain are adapted to project to properly position the chain in cooperative relation to the sprocket. Mounted on the intermediate housing 11 is a countershaft 17 on which is journaled a double sprocket idler 18 formed to receive the chain 15 and to similarly receive a second chain 19. The chain 19 continues up within the section 12 and passes about shaft 20 and a sprocket 21 keyed or otherwise secured thereto.

In a two-cycle engine, the cam shaft has the same rotary speed as the crank shaft, and if desired the sprockets 14 and 21 may be of the same pitch diameter as shown.

The idler 18 is rotatably mounted on the countershaft 17, the latter passing thru the arms 22 of a yoke 23. The ends 24 of the yoke provide part-spherical sockets 25 receiving the part-spherical ends 26 of the adjusting bolts 27 whose shanks extend loosely thru said ends. A hinge connection could be employed instead, affording movement in a plane normal to the drawings.

If desired, the yoke could be pivotally but otherwise immovably connected with one adjusting member such as the member 27 to effect adequate adjustment of the countershaft sprocket.

The bolts 27 also extend loosely thru bosses 28 formed on the casing section 11 and receive adjusting nuts 29 threaded on said bolts. The clearance permits adjustment of the bolts without rattling.

In a chain drive, slack develops and it is accordingly necessary to provide some form of adjustment to take up the slack. It is of utmost importance that the slack in both chains be taken up at the same time, and in proportion to the lengths of the chains, so that the phase relation between the crank shaft and cam shaft will not be disturbed.

In order that the take-up of slack in the chains 15 and 19 may be complete and simultaneous, provision is made for the shift of the idler shaft 17 in a predetermined path, such that each point in the path is distant from the axes of the crank and cam shafts in a fixed ratio. This path is found graphically or by analytic geometry to be a circle. When the ratio equals unity, the diameter is infinite. When the ratio is not equal to unity the diameter is finite. When one of the distances is smaller than the other, obviously the circle encloses the shaft which is the smaller distance from the idler or countershaft. Obviously also the circle passes thru the axis of the countershaft.

The diameter may be ascertained as follows:

Referring to Fig. 5, the point A represents the axis of the crank shaft, the point B represents the axis of the cam shaft, and the point O lies on the line connecting the points A and B and divides that line into two distances whose ratio is the same as that of the distances of the crank and cam shafts from the axis of the countershaft in Fig. 1. The point C lies on a continuation of the line AB, and is distant from A and from B in the same ratio that the point O is distant from the point A and from the point B. Since the elongation of each chain is substantially proportional to the portion of its length under tension, the length of which portion is equal or approximately equal to the distance between the axes of the sprockets engaged by the chain, it necessarily follows that the idler shaft, when adjusted to take up the slack in both chains, is moved in the path of a circle, substantially.

Inasmuch as the points O and C represent the extreme positions theoretically, adapted to be occupied by the counter-shaft axis while in the substantially circular path aforesaid, the distance OC is a diameter of the circle. This diameter obviously is the sum of the distances OB and BC.

Since the ratio of distances from any point on the circle to A and B is constant, which we will call K, it follows that $$\frac{AO}{OB} = K$$

and $$\frac{AO + OB + BC}{BC} = K$$

whence $$BC \times K - BC = AO + OB$$

Since $$OB = \frac{AO}{K}$$

$$BC(K-1) = AO + \frac{AO}{K}$$

$$= \frac{AO(K+1)}{K}$$

Hence $$BC = \frac{AO(K+1)}{K(K-1)}$$

Since diameter = OB + BC, it follows that $$\text{Diameter} = \frac{AO}{K} + \frac{AO(K+1)}{K(K-1)}$$

$$= \frac{AO}{K} \times \left(1 + \frac{K+1}{K-1}\right)$$

$$= \frac{AO}{K} \times \left(\frac{K-1+K+1}{K-1}\right)$$

$$= \frac{AO \times 2K}{K(K-1)}$$

$$= 2\frac{AO}{K-1}.$$

Substituting $\frac{AO}{OB}$ for $K$, we have $$\text{Diameter} = 2\frac{AO}{\frac{AO}{OB} - 1}$$

$$= 2\left(\frac{AO \times OB}{AO - OB}\right)$$

The housing 11 is accordingly provided with guide slots 30 extending in a substantially circular path enclosing the cam shaft 20 and whose diameter is obtained from the foregoing formula. The distance AO as applied to Fig. 1 being the smallest distance between the axis of the crank shaft 13 and the circle.

The ends 31 of the shaft 17 are reduced and fitted in bearing blocks 32 having walls 33 and 34 parallel to the arc of said circle passing through the axis of the shaft 17, and of substantially the same curvatures as the cooperating slot walls 35 and 36. The pivot connection at 25 and 26 will permit this arcuate movement of the idler shaft 17, and the adjusting nuts 29 may be operated to fixedly position said shaft at the point desired, with the chains 15 and 19 tightened to the desired extent. It will be observed that the slot 30 as shown in Fig. 3 affords adequate clearance to allow the shaft 17 to be adjusted to the left throughout a substantial extent to take up slack in the chains. Cover plates 37 removably secured to the housing 11 serve to hold the blocks 32 in assembled relation with the remainder of the structure and may be removed when it is desired to dismantle the countershaft and sprocket assembly.

The housing 11, as has been explained, forms with the idler sprocket assembly a unit removably bolted or otherwise removably secured in place between the lower casing section 10 and upper casing section 12. The latter sections are preferably constructed to render the chains accessible for inspection at any time, so that a link of each chain may be removed to allow the housing 11 and associated sprocket and shaft structure to be removed and replaced as a unit.

Figs. 6 and 7 show a chain drive arrangement differing from that of Fig. 1 only in that the chains are of equal length whereas in Fig. 1 they are of unequal length. Quite obviously equal adjustment of the chains will be accomplished by adjusting the shaft 17 in a straight line which the perpendicular bisector of the line of centers of the crank shaft and cam shaft. This is also evident upon reference to the above formula for the diameter of the circle constituting the focus of points through which the axis of the countershaft may pass in the various adjustments thereof. From said formula, it is evident that since the value of K for the arrangement of Figs. 6 and 7 having chains of equal length is unity, the denominator becomes zero and accordingly the diameter is infinite, giving us a straight line.

In view of this substantially straight line adjustment, the ball and socket connections at 25 and 26 in the previously described form of the invention need not be employed. Rather, adjusting bolts 40 may be threaded or otherwise suitably secured to the yoke 41 and extend loosely through the bosses 42 in the intermediate housing 43 and are held in adjusted position by the nuts 44 in a manner explained in connection with the previous form of the invention. The straight line adjustment is afforded by the position of opposed straight slots 45 in the housing 43, as shown in Fig. 7, whose walls 46 are parallel to the line passing thru the axis of the shaft 17 and lying in the perpendicular bisector of the line of centers of the shafts 13 and 20. The bearing blocks 47 about the reduced ends 31 of the countershaft 17 are formed to slide along the walls 46 as the countershaft and sprocket assembly are adjusted.

Removal and replacement of the assembly including the sprocket, countershaft and housing 43, may be accomplished in the same way as described in connection with the first form of the invention.

With the foregoing construction, it will be appreciated that the adjustment and phase restoration may be effected without stopping the drive, merely by backing away the nuts at the right, advancing the nuts at the left to the desired degrees of tension of the chains, and then tightening the nuts at the right to maintain the desired adjustment.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In a chain drive, crank and cam shaft sprockets of substantially the same pitch, a countershaft double sprocket of substantially uniform pitch, a chain connecting said crank shaft sprocket to said double sprocket, a chain of the same strength and quality as the first mentioned chain connecting said cam shaft sprocket to said double sprocket, housings for said sprockets, the countershaft housing and sprocket forming part of an assembled unit secured to the other housings and removable and installable without disturbing the other housings, and means for adjusting said double sprocket in such a path as to tension said chains in substantially the same proportion as their lengths, so as to restore said crank shaft and cam shaft sprockets to their initial timing setting.

2. In a chain drive, a driving sprocket, a driven sprocket, an intermediate sprocket, chains connecting the intermediate sprocket to each of the driving and driven sprockets, the chains being initially of the same strength and quality, and means for moving said intermediate sprocket in such a path as to take up substantially the entire slack in both chains at substantially the same time, said path being defined by a circle, the diameter of which is equal to $$2 \times \frac{AO \times OB}{AO - OB}$$

where AO and OB are the distances from the intermediate sprocket to the driving and driven sprockets respectively.

3. In a chain drive, equal driving and driven sprockets, an intermediate double sprocket of uniform pitch, chains of unequal length and substantially equal strength and quality connecting said intermediate sprocket to said driving and driven sprockets, and means providing for adjustment of said intermediate sprocket in such a path as to take up substantially the entire slask in both chains substantially at the same time, said path being defined by a circle the diameter of which is equal to $$2 \times \frac{AO \times OB}{AO - OB}$$

where AO and OB are the distances from the intermediate sprocket to the driving and driven sprockets respectively.

4. In a chain drive including driving and driven sprockets and housings for said sprockets, an assembly comprising a sprocket, a countershaft on which said sprocket is mounted, said shaft having reduced ends, bearing blocks receiving said ends, a housing having opposed slots in which said blocks are slidable to vary the distance of the countershaft sprocket from the other two sprockets, covers for the slots, a yoke about said shaft and having guiding bearing engagement with said housing in parallelism with said slots to insure movement of said blocks in unison, means for adjusting said yoke and thereby said countershaft sprocket, and means for removably securing said countershaft housing to the driving and driven sprocket housings to enable the assembly to be removed and installed as a unit.

5. In a chain drive including driving and driven sprockets and housings therefor, an assembly comprising a sprocket, a countershaft on which said last mentioned sprocket is mounted, a housing having a slotted portion in which said countershaft sprocket is shiftably supported to vary the distance of said countershaft sprocket from the other two sprockets, means for securing said countershaft sprocket in the desired adjustment, and means for removably securing said countershaft housing to the driving and driven sprocket housings to enable the assembly to be removed and installed as a unit.

6. In a chain drive including driving an driven sprockets and a countershaft sprocket distant from said driving and driven sprockets in a predetermined ratio and chains of substantially equal strength and quality connecting said countershaft sprocket with said driving and driven sprockets, a support for said countershaft sprocket, means for shifting said sprocket relative to said driving and driven sprockets in a direction to take up slack in the chains, means including said support for constraining movement of said countershaft to a circular path, all points of which are distant from the axes of the driving and driven sprockets substantially in said ratio, adjusting means connected to said countershaft sprocket and including manipulating means accessible from the outside of the support and threaded to said adjusting means to adjust said countershaft sprocket in said path, the connection between said adjusting means and said countershaft sprocket affording such relative angular movement therebetween as adjustment of said countershaft sprocket may require.

LON SLOAN.